United States Patent
Kent et al.

(12)

(10) Patent No.: US 6,861,080 B2
(45) Date of Patent: Mar. 1, 2005

(54) DAIRY PRODUCTS WITH REDUCED AVERAGE PARTICLE SIZE

(75) Inventors: Clinton Kent, Evanston, IL (US); Jim Bay P. Loh, Green Oaks, IL (US); Hermann Eibel, Freising (DE)

(73) Assignee: Kraft Foods Holdings, Inc., Northfield, IL (US)

( * ) Notice: Subject to any disclaimer, the term of this patent is extended or adjusted under 35 U.S.C. 154(b) by 157 days.

(21) Appl. No.: 10/154,950

(22) Filed: May 24, 2002

(65) Prior Publication Data

US 2003/0219510 A1 Nov. 27, 2003

(51) Int. Cl.[7] .................................. A23C 9/12
(52) U.S. Cl. .................. 426/36; 426/34; 426/38; 426/39; 426/42; 426/43; 426/582
(58) Field of Search .................. 426/34, 36, 38, 426/39, 42, 43, 580, 582, 519

(56) References Cited

U.S. PATENT DOCUMENTS

| | | |
|---|---|---|
| 4,244,983 A | 1/1981 | Baker |
| 4,324,804 A | 4/1982 | Davis |
| 4,341,801 A | 7/1982 | Weissman |
| 4,379,175 A | 4/1983 | Baker |
| 4,390,560 A | 6/1983 | Koide et al. |
| 4,397,878 A | 8/1983 | Koide et al. |
| 4,534,982 A | 8/1985 | Yoshida et al. |
| 4,724,152 A | 2/1988 | Baker et al. |
| 4,732,769 A | 3/1988 | Sozzi et al. |
| 4,873,094 A | 10/1989 | Pischke et al. |
| 5,656,320 A | 8/1997 | Cheng et al. |
| 5,882,704 A | 3/1999 | Yamaguchi et al. |
| 6,093,424 A | 7/2000 | Han et al. |
| 6,406,736 B1 | 6/2002 | Han |

FOREIGN PATENT DOCUMENTS

| | | |
|---|---|---|
| EP | 1 201 134 | 5/2002 |
| WO | WO 93/22930 | 11/1993 |
| WO | WO 94/21129 | 9/1994 |
| WO | WO 94/21130 | 9/1994 |
| WO | WO 97/01961 | 1/1997 |

OTHER PUBLICATIONS

Lemay et al., "Influence of Microfluidization of Milk on Cheddar Cheese Composition, Color, Texture and Yield", *Journal of Dairy Science*, vol. 77, No. 10, 2870–2879, 1994.

*Primary Examiner*—Leslie Wong
(74) *Attorney, Agent, or Firm*—Fitch, Even, Tabin & Flannery

(57) ABSTRACT

The present invention relates to superior dairy products which have firmness qualities and textural qualities not observed in conventional dairy products. The dairy products of this invention have average fat particle sizes of less than about 0.8 microns, preferably of about 0.1 to about 0.8 microns, and more preferably about 0.2 to about 0.6 microns. The dairy products which may be manufactured using this process are cream cheese, sour cream, and dairy products containing at least 4 percent fat. The present invention also provides a process for making a cream cheese product without the removal of whey and having average fat particle sizes of less than about 0.8 microns, preferably of about 0.1 to about 0.8 microns, and more preferably about 0.2 to about 0.6 microns.

32 Claims, 2 Drawing Sheets

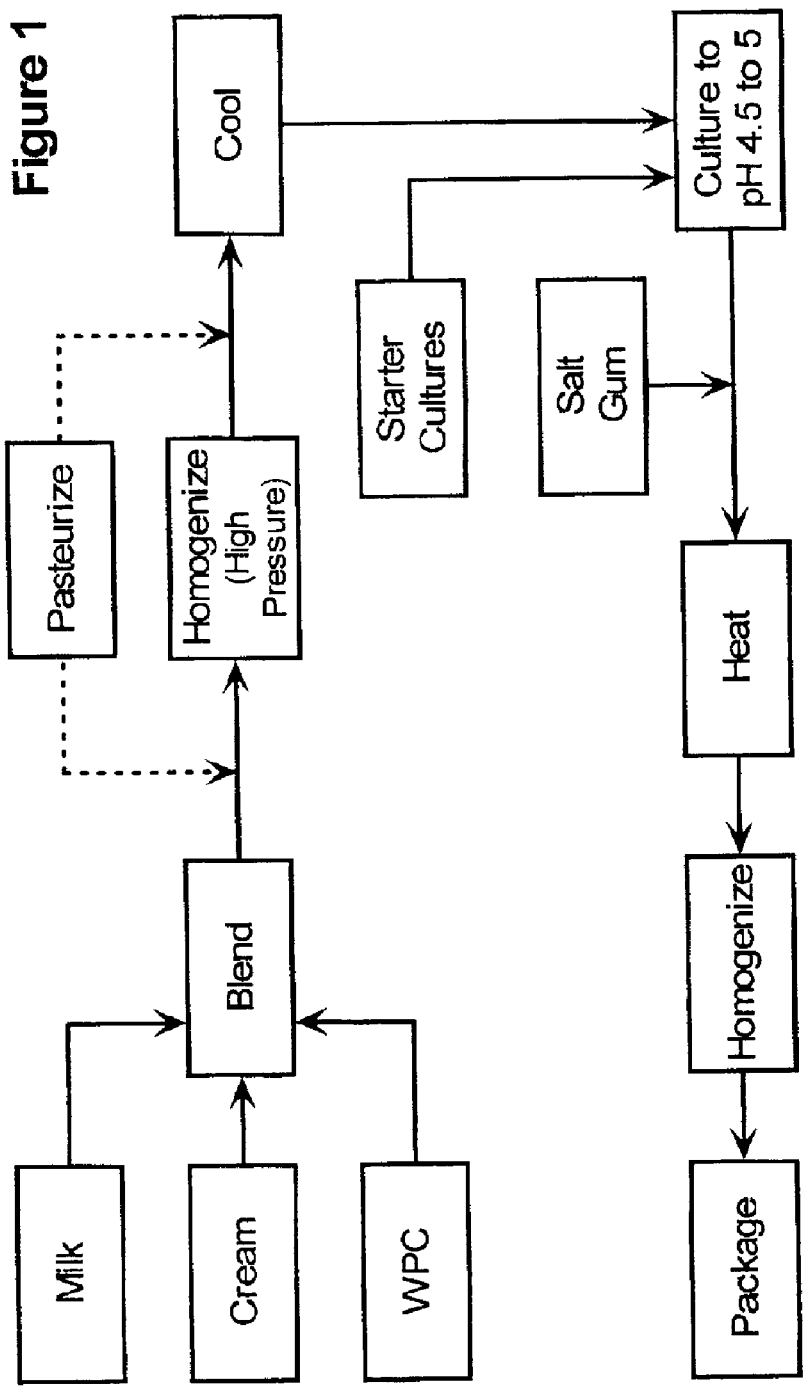

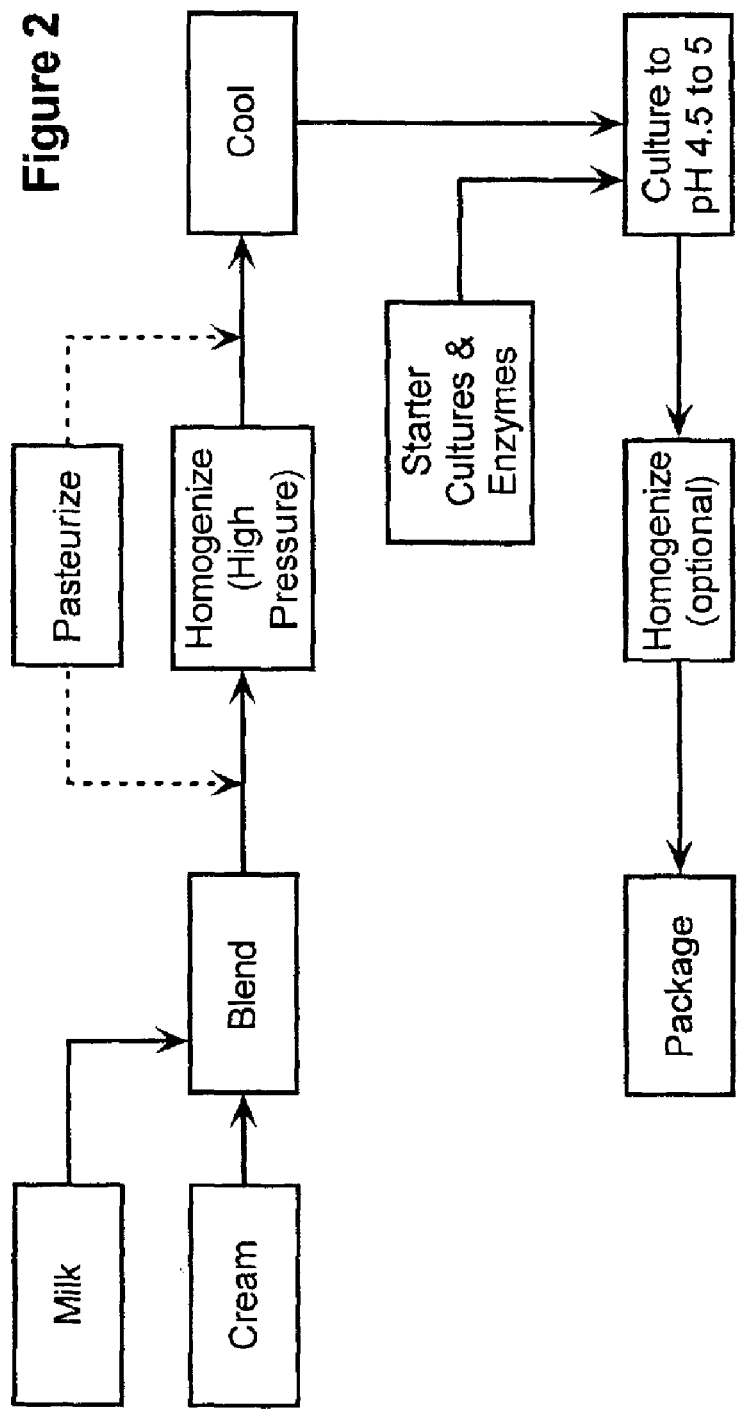

DAIRY PRODUCTS WITH REDUCED AVERAGE PARTICLE SIZE

FIELD OF THE INVENTION

The present invention relates to superior dairy products which have firmness qualities and textural qualities not observed in conventional dairy products. The dairy products of this invention have average fat particle sizes of less than about 0.8 microns, preferably of about 0.1 to about 0.8 microns, and more preferably about 0.2 to about 0.6 microns as compared to conventional dairy products which typically have average fat particle sizes greater than about 1 micron. The dairy products which may be manufactured using this process include cream cheese, sour cream, and dairy products containing at least 4 percent fat. The present invention uses an initial treatment (e.g., high pressure homogenization, high shear mixing, ultrasound, cavitation, and the like) of a mixture of a liquid dairy substrate, fat, and protein, followed by culturing and heating the homogenate to produce a dairy product having smaller fat droplets suspended in the homogenate. The smaller droplet size increases firmness due to more particle-particle interactions. A firmer product will allow the manufacturer to use less protein, and therefore reduce cost, to formulate dairy compositions while maintaining high quality. The process claimed herein also permits the manufacturer to generate reduced fat particle size-containing dairy compositions without the use of emulsifiers. Although such emulsifiers can be used to reduce the fat droplet size, the products prepared, however, cannot be classified as natural or wholly dairy products (i.e., they must generally be classified as imitation cream cheese or imitation sour cream products); thus, it is desirable to avoid the use of such emulsifiers.

The present invention is also related to a method for making cream cheese having average fat particle sizes of less than about 0.8 microns without the whey removal step normally associated with cream cheese manufacture and having firmness qualities and textural qualities not observed in conventional dairy products. The method utilizes a high whey protein system which requires less acid to reach the requisite pH levels for cheese development, and thus produces a cheese without the high acid flavor defect commonly associated with cheese produced by a wheyless process. Additionally, the method enables a higher retention of whey proteins in the resulting cheese, which provides positive nutritional benefits. The present invention uses an initial treatment (e.g., high pressure homogenization, high shear mixing, ultrasound, cavitation, and the like) of a liquid dairy substrate (i.e., combination of dry and liquid dairy ingredients), fat, and protein, followed by culturing and heating the homogenate to produce a dairy product having smaller fat droplets suspended in the homogenate.

BACKGROUND OF THE INVENTION

Conventional cheese-making processes typically require the removal of a significant amount of moisture in the form of whey in order to produce the final product. Such processes generally comprise developing acidity in milk and setting the milk with a clotting agent, such as rennet, or by developing acidity to the isoelectric point of the protein. The set milk is cut and whey is separated from the resulting curd. The curd may be pressed to provide a cheese block, which may then be cured, depending on the type of cheese to be produced. Generally such conventional cheese products have an average fat particle size of about 1 micron or higher.

On average, in conventional cheese-making processes, approximately three to ten pounds of milk will yield approximately one pound of cheese. Accordingly, producing cheese by conventional procedures requires not only the transport and storage of large volumes of fluid milk, but the treatment and removal of significant amounts of acid whey, which adds significant costs and logistical complications to the cheese manufacturing process.

In the past, there have been significant attempts to produce cheese products without the removal of whey. For example, U.S. Pat. No. 4,244,983 (Jan. 13, 1981), and U.S. Pat. No. 4,379,175 (Apr. 5, 1983) provide a low-fat imitation cream cheese product. The product is prepared by mixing milk, a fat-containing carrier and stabilizer, heating, and then mixing with cottage cheese curd. Preservatives and flavorings may be added before or after heating. The mixture is then homogenized and prepared for packaging.

U.S. Pat. No. 4,724,152 (Feb. 9, 1988) provides a low-fat cream cheese product and a method for the preparation of such a product. The product is prepared by mixing milk, a milk-fat containing carrier, and nonfat dry milk solids to form a dressing mixture which is pasteurized and homogenized. A stabilizer and cottage cheese curd is then added and the mixture is again homogenized. Preservatives and flavorings may be added before or after the final homogenization step. The product is then hot-packed into final packaging.

U.S. Pat. No. 4,397,878 (Aug. 9, 1983) provides a method for producing a cream cheese-like food comprising the steps of (1) dissolving casein, an oil or fat, an emulsifying agent, lactose, a calcium salt, and an orthophosphate in water; (2) pasteurizing and homogenizing the resulting mixture to form an emulsion; (3) adding culture and fermenting until a pH of 5.4 to 5.9 is reached; (6) adding stabilizers and other additives; (7) pasteurizing; (8) filling into containers, and (9) cooling. Similarly, U.S. Pat. No. 4,390,560 (Jun. 28, 1983) discloses a process for the production of a cream cheese-like food using gluconic δ-lactone to lower pH rather than lactic acid producing bacterial cultures.

Finally, U.S. Pat. No. 5,882,704 (Mar. 16, 1999) discloses a process for producing a soft, pasty cream cheese-like product for use in pastry applications. A cream mix consisting of 2 to 15 percent of a protein component, 2 to 15 percent of a carbohydrate component, 10 to 50 percent of a fat component, 40 to 74 percent water, and a minor amount of an emulsifier is cultured and then pasteurized, homogenized, and cooled.

While the procedures outlined above generally provide for the production of various cream cheese-like products without the removal of whey, they still have a number of problems and/or disadvantages. For example, the procedures outlined in U.S. Pat. Nos. 4,244,983, 4,379,175, and 4,724,152 require the use of a substantial amount of cottage cheese curd, which is made by conventional cheese-making procedures. Thus while the primary process to make the cream cheese product avoids the complications associated with acid whey removal, the production of a major component to be used in the execution of the final product does not. Additionally, the procedures outlined in U.S. Pat. Nos. 4,397,878 and 4,390,560 use emulsifier salts to develop proper consistency and texture in the cream cheese-like product. Emulsifier salts, while providing a homogeneous texture, also impart an undesirable salty flavor. Moreover, under current Standards of Identity, a cream cheese prepared using emulsifying salts cannot be classified as a natural cheese. Finally, U.S. Pat. No. 5,882,704, in addition to employing emulsifier salts, is limited to the production of a soft, pasty cream cheese-like product for use in bakery applications.

Thus, it would be desirable to provide an improved method for producing a natural cream cheese containing significant amounts of beneficial whey proteins. It would also be desirable to provide an improved method of producing a natural cream cheese without an acid whey removal step. It would also be desirable to provide an improved method of producing a natural cream cheese using nonperishable dairy ingredients. The present invention provides such improved methods and products. In addition, the present invention provides methods for producing dairy products which have significantly reduced average fat particle sizes relative to the corresponding conventional dairy products. Such dairy products include, for example, cream cheese (prepared using either a whey or wheyless process), sour cream, and dairy products containing at least 4 percent fat. Preferred dairy products include cream cheese and sour cream. An especially preferred dairy product as prepared by the present invention is a cream cheese using a wheyless process.

SUMMARY OF THE INVENTION

The present invention is a process for manufacturing superior dairy products in which a liquid dairy substrate, fat, and protein are mixed to generate a dairy mix. Such dairy products include, for example, cream cheese (prepared using either whey or wheyless process), sour cream, and dairy products containing at least 4 percent fat. A dairy mix is subjected to a particle-size-reduction treatment sufficient to reduce the average particles size of the final dairy product to less than about 0.8 microns, preferably about 0.1 to about 0.8 microns, and most preferably about 0.2 to about 0.6 microns. Examples of such particle-size-reduction treatments to achieve the desired average particle size include high pressure homogenization, high shear mixing, ultrasound, cavitation, and the like.

In a preferred embodiment, the particle-size-reduction treatment includes either single-stage or two-stage high pressure homogenization. Using single-stage homogenization, the pressure is greater than about 6000 psi, and preferably in the range of about 7500 to about 15,000 psi to generate a homogenate. Using two-stage homogenization, the first homogenization is greater than about 6000 psi, and preferably in the range of about 7500 to about 15,000 psi, to generate a first homogenate. The first homogenate is subjected to a second homogenization at less than about 1000 psi to generate a second homogenate. Preferably, a two-stage homogenization process is employed in the present invention. The homogenate from the single-stage homogenization process or the second homogenate from the two-stage homogenization process is fermented or acidified by the addition of an edible acid to a pH of about 4.5 to about 5 to form an acidified homogenate. The acidified homogenate is heated at about 180 to about 205° F. for about 2 to about 20 minutes to produce a dairy product having improved creaminess, resistance to syneresis, and firmness.

In an important embodiment, the present invention is also directed to a method of producing a natural cream cheese product containing significant amounts of whey protein, without the removal of whey, and having reduced average particle size. The elimination of the whey removal step provides significant benefits over traditional processes such as improved yield of usable product from staring raw materials, and elimination of costly treatment of acid whey. Moreover, the use of nonperishable powdered dairy ingredients may provide additional benefits in production flexibility.

In an important aspect of the invention, the buffering capacity disparity between casein and whey protein allows for the use of a reduced level of acidifying agents, which enables the production of a final cream cheese product which is free of the high-acid flavor defect normally associated with cheese produced by a wheyless process.

In order to produce a cream cheese product with the proper textural attributes, the cheese-make blend must attain a pH level at or near the isoelectric point of milk (i.e., about 4.7). In traditional cream cheese processes utilizing standard milk and cream as staring materials and having a casein to whey protein ratio of approximately 80:20, a significant level of acid must be added to reach the isoelectric point of milk due to the high buffering capacity of casein. Despite the high level of acid needed for proper curd formation, a substantial amount of the acid is removed with the whey stream, thus producing an organaleptically pleasing product. However, when standard concentrated milk and cream ingredients are used in a wheyless process, the excess acid is not removed, and thus a product with an unacceptable acidic flavor or "acid bite" is produced. The process of the present invention overcomes this defect by utilizing a blend of dairy ingredients wherein the ratio of casein to whey protein is lower than that found in typical dairy ingredients. Because the buffering capacity of whey protein is substantially less than that of casein, less acid is needed to reach the isoelectric point of milk, thus a product with excellent flavor and texture can be produced despite the absence of a whey removal step in the process.

In another important aspect of the invention, it is critical to target the moisture and fat of the initial ingredients to that of the desired end product, taking into account moisture gains or losses during processing. Utilizing combinations of concentrated or dry dairy ingredients of various moisture and fat levels can be useful in this regard.

The present invention provides a method for manufacturing a dairy product having improved firmness, said method comprising: (1) mixing dairy ingredients comprising a dairy substrate, fat, and protein to generate a liquid dairy mix; (2) treating the liquid dairy mix to generate an emulsion having an average fat particle size of less than about 0.8 microns; (3) adding an acid-producing culture or an edible acid to the emulsion to reduce the pH to generate an acidified emulsion; and (4) heating the acidified emulsion to produce the dairy product; wherein the dairy product has a final average fat particle size of less than about 0.8 microns, and wherein the dairy product has improved firmness.

The present invention also provides a method for manufacturing a dairy product having improved firmness, said method comprising: (1) mixing dairy ingredients comprising a dairy substrate, fat, and protein to generate a liquid dairy mix containing about 4 to about 30 percent fat and about 2 to about 8 percent protein; (2) subjecting the liquid dairy mix to high pressure homogenization step at total pressure of at least about 7500 psi to generate a homogenate; (3) adding an acid-producing culture or an edible acid to the homogenate to reduce the pH to about 4.5 to about 5.0 to generate an acidified homogenate; (4) heating the acidified homogenate at about 180 to about 205° F. for about 2 to about 20 minutes to produce the dairy product; wherein the dairy product has an average fat particle size of about 0.1 to about 0.8 microns, and wherein the dairy product has improved creaminess, resistance to syneresis, and firmness.

The present invention also provides a method for producing a natural cream cheese having improved firmness and without the removal of whey, said method comprising the steps of: (1) providing a first liquid blend of dairy ingredients comprising about 20 to about 45 percent total solids, about 10 to about 30 percent fat, and about 4 to about 8 percent protein, wherein the whey protein to casein ratio is at least about 60:40; (2) heating the first liquid blend to a temperature and for a time sufficient to melt the fat in the liquid blend; (3) treating the heated first liquid blend to generate an emulsion having an average fat particle size of less than about 0.8 microns; (4) heating the emulsion to a temperature of about 162 to about 205° F. for about 15 seconds to about 5 minutes; (5) cooling the heated emulsion to about 32 to about 90° F.; (6) treating the cooled emulsion with an acidifying agent to provide a second liquid blend having a pH of about 4.5 to about 5; (7) heating the pH-adjusted second liquid blend to about 140 to about 175° F.; (8) adding salt and stabilizers to the heated pH-adjusted second liquid blend to provide a third liquid blend; (9) heating the third liquid blend to about 180 to about 205° F. for at least 5 minutes; (10) cooling the heated third liquid blend to about 155 to about 180° F.; (11) homogenizing the cooled third liquid blend at a pressure of about 500 to about 4000 psi to obtain the natural cream cheese; and (12) filling the natural cream cheese into appropriate containers, wherein the natural cream cheese has a final average fat particle size of less than about 0.8 microns, and wherein the natural cream cheese has improved firmness.

The present invention also provides a method for producing a cream cheese without the removal of whey, said method comprising the steps of: (1) providing a blend of dairy ingredients comprising a dairy substrate, fat, and protein having a whey protein to casein ratio of at least about 60:40 to obtain a mixture; (2) homogenizing the mixture to obtain an emulsion having an average fat particle size of less than about 0.8 microns; (3) treating the emulsion with an acidifying agent; (4) adding a stabilizer to the treated emulsion to form a first mixture; (5) blending the first mixture to provide the cream cheese; and (6) filling the cream cheese into appropriate containers, wherein the cream cheese has a final average fat particle size of less than about 0.8 microns, and wherein the cream cheese has improved firmness.

The present invention also provides a method for producing a sour cream having improved firmness, said method comprising the steps of: (1) providing a blend of dairy ingredients comprising a dairy substrate, fat, and protein; (2) pasteurizing the blend before or after step (3); (3) homogenizing the blend to obtain an emulsion having an average fat particle size of less than about 0.8 microns; (4) treating the pasteurized emulsion with an acidifying agent to provide the sour cream; and (6) filling the sour cream into appropriate containers, wherein the sour cream has a final average fat particle size of less than about 0.8 microns, and wherein the sour cream has improved firmness.

Examples of dairy ingredients suitable for use in the present invention are whole milk, reduced fat milk, fat-free milk, skim milk, milk protein concentrates, fat-enriched milk protein concentrates, cream, anhydrous milk fat, concentrated milk fat, whey, whey protein concentrates, fat-enriched whey protein concentrates, whey protein isolates, and the like as well as mixtures thereof. The dairy ingredients used to practice the invention may be in natural liquid form, concentrated liquid form, dried form or liquid form made from reconstituted solids.

BRIEF DESCRIPTION OF THE DRAWINGS

FIG. 1 provides a flowchart illustrating the general process of this invention for preparing a wheyless cream cheese product.

FIG. 2 provides a flowchart illustrating the general process of this invention for preparing a sour cream product.

DETAILED DESCRIPTION OF THE INVENTION

The present invention is a process for manufacturing superior dairy products in which a liquid dairy substrate, fat, and protein are mixed to generate a dairy mix. Such dairy products include, for example, cream cheese (prepared using either a whey or a wheyless processes), sour cream, and dairy products containing at least 4 percent fat. A dairy mix is subjected to a particle-size-reduction treatment sufficient to reduce the average particles size of the final dairy product to less than about 0.8 microns, preferably about 0.1 to about 0.8 microns, and more preferably about 0.2 to about 0.6 microns. Examples of such particle-size-reduction treatments to achieve the desired average particle size include high pressure homogenization, high shear mixing, ultrasound, cavitation, and the like. Generally, the particle-size-reduction treatment reduces the average particle of the resulting homogenate to about 0.1 to about 1 micron, preferably about 0.1 to about 0.8 microns, and more preferably to about 0.2 to about 0.6 microns.

In a preferred embodiment, the particle-size-reduction treatment includes either single-stage or two-stage high pressure homogenization. Using single-stage homogenization, the pressure is greater than about 6000 psi, and preferably in the range of about 7500 to about 15,000 psi to generate a homogenate. Using two-stage homogenization, the first homogenization is greater than about 6000 psi, and preferably in the range of about 7500 to about 15,000 psi, to generate a first homogenate. The first homogenate is subjected to a second homogenization at less than about 1000 psi to generate a second homogenate. Preferably, a two-stage homogenization process is employed in the present invention. The homogenate from the single-stage homogenization process or the second homogenate from the two-stage homogenization process is fermented or acidified by the addition of an edible acid to a pH of about 4.5 to about 5 to form an acidified homogenate. The acidified homogenate is heated at about 180 to about 205° F. for about 2 to about 20 minutes to produce a dairy product having improved creaminess, resistance to syneresis, and firmness.

The invention also provides a novel and improved process for preparing a cream cheese product without the removal of whey. The invention also relates to a cream cheese containing up to 90 percent of total whey protein (including whey protein derived from retaining whey in the process and added whey protein). In an important aspect of the invention, the method takes advantage of the lower buffering capacity of whey proteins to produce a cheese that is free of the objectionable high-acid flavor often associated with wheyless cheese.

As used herein, the average particle size for both dairy emulsions and finished products refers to the median diameter of fat droplets based on particle volume. The medium particle size is measured using the following technique: (1) Prepare 10× dilution sample with 2% SDS solution in deionized water (i.e., 1 g sample+9 g 2% SDS solution) in a glass vial. (2) Agitate for about 5–30 sec with Vortex mixer. (3) Hold sample overnight to allow fat particles to cream to top of vial and then removed the cream layer with plastic pipette. This should eliminate the "extraneous" particulate material (i.e., starch and insoluble protein) and only allow for the fat particles to be sampled. (4) Several drops of the cream layer are added into the sample cup until the % transmittance is between 90% to 85%. (5) Samples are analyzed using a Horiba LA-900 (Horiba Instruments, Inc., Irvine, Calif.) particle size analyzer with the following settings: complex relative refractive index (RRI) at 1.11±0.001; agitation setting at 1 (lowest setting); circulation: setting at 3 (medium speed); dispersant at 200 ml of deionized water and target % laser transmittance at 100% with deionized water alone and about 85–90% with sample. Generally, a normal particle size distribution is obtained from which median diameter can be calculated. In case of non-normal particle size distributions (i.e., bimodal or more complex) which may result from unstable emulsions or a mixture of two or more emulsions with different particle size, medium particle size should be determined based on the sub-population of the smallest medium particle size (and which will normally be present in the highest amount).

As used herein, "whey protein" relates to the proteins contained in dairy liquid obtained as a supernatant of the curds when milk or a product containing milk components are curded to produce a semisolid cheese curd. Whey protein is generally understood to include principally the globular proteins β-lactoglobulin and α-lactalbumin; it also includes a significantly lower concentration of immunoglobulin and other globulins. The whey employed in the invention may be natural whey liquid directly provided by a cheese making process. It may additionally be whey concentrate obtained by processes known to the skilled artisan in dairy chemistry such as evaporation and/or ultrafiltration (alone or combined with diafiltration). The whey may also be a reconstituted liquid obtained by adding water or an aqueous composition to whey solids, wherein the reconstituted concentration may be lower than, about equal to, or greater than the concentration of natural whey. All these whey preparations include whey protein.

As used herein, the term "dairy ingredient" relates to milk, or to a milk product obtained by fractionation of raw milk to provide a liquid fraction, a solid milk fraction, or a solid milk fraction that is reconstituted to a liquid. The milk may be treated to remove some, or all, of the butterfat, providing reduced fat milk, or fat-free milk, respectively. Furthermore, whole milk, reduced fat milk, skim milk, or fat-free milk may be concentrated by methods such as evaporation, ultrafiltration, ultrafiltration combined with diafiltration, and the like. Evaporation provides dairy compositions containing a higher concentration of all the non-volatile components; ultrafiltration provides dairy liquids as the retentate having a higher concentration of the components that do not permeate the ultrafiltration membrane as compared to the starting liquid. Furthermore, any of the above dairy liquids may be evaporated to dryness, providing milk solids originating from whole milk, reduced fat milk, skim milk, or fat-free milk. Any of these solids may be reconstituted by the addition of water or a suitable aqueous composition including milk or a milk fraction. Reconstitution of dry milk products thus provides dairy ingredients that in general may have a broad range of final concentrations of proteins, butterfat, and other components. Additionally, a dairy ingredient as used herein may include added cream or other sources of butterfat. All the above ingredients are included in the designation of "dairy ingredients" as used herein. The dairy ingredients comprise a dairy substrate, fat, and protein and form a liquid dairy mixture. The liquid dairy mixture must contain sufficient fat to allow formation of fat particles of the desired size. Generally the liquid dairy mixture contains about 4 to about 30 percent fat. The dairy ingredients employed in the present invention may originate from any lactating livestock animal whose milk is useful as a source of human food. Such livestock animals include, by way of nonlimiting example, cows, buffalo, other ruminants, goats, sheep, and the like. In a preferred embodiment, products derived from cows' milk provides the basis for dairy ingredients used in the practice of the invention.

As used herein "acidifying agent" relates to an acid suitable for food applications, or lactic acid producing bacterial cultures which convert dairy sugars into lactic acid.

As used herein "stabilizers" relates to food-grade gums such as carob, xanthan, guar gum, and mixtures thereof. Conventional emulsifiers are not used in the present invention.

In an important aspect of the invention, the dairy ingredients provide a ratio of whey protein to casein to greater than about 60:40, which allows for the use of about half the level of acidifying agents normally needed to reach the desired pH of about 4.7.

In a preferred embodiment of the invention, a method is provided for producing a natural cream cheese without the removal of whey comprising the steps of: (1) providing a blend of dairy ingredients comprising about 20 to about 45 percent total solids, at least about 4 percent fat, and about 4 to about 8 percent protein, wherein the whey protein to casein ratio is at least about 60:40; (2) heating the mixture to a temperature of about 122 to about 167° F.; (3) homogenizing the mixture at a pressure of greater than about 6000 psi to reduce the average particle size to less than about 0.8 microns; (4) heating the resulting mixture to a temperature of about 162 to about 205° F. for about 15 seconds to about 5 minutes; (5) cooling the mixture to about 32 to about 90° F.; (6) treating the mixture with an acidifying agent to provide a pH of about 4.5 to about 5; (7) heating the mixture to about 140 to about 175° F.; (8) adding salt and stabilizers to the mixture; (9) heating the mixture to about 180 to about 205° F. for at least 5 minutes; (10) cooling the mixture to about 155 to about 180° F.; (11) homogenizing the mixture at a pressure of about 1500 to about 4000 psi; and (12) filling the final mixture into appropriate containers. The method produces a cream cheese product which contains from about 50 to about 90 percent whey proteins. More preferably the blend of dairy ingredients in step (1) comprises about 30 to about 45 percent total solids, about 10 to about 30 percent fat, and about 4 to about 8 percent protein, with the whey protein to casein ratio being about 60:40 to about 90:10.

In addition to providing a plain cream cheese product, other food ingredients may optionally be added during processing to produce cream cheese products with other foods. By way of nonlimiting example, food ingredients such as spices, flavorants, colorants, fruits, nuts, vegetables, confections, and mixtures of these or other ingredients may be used. By way of nonlimiting example, a strawberry flavoring may be added to improve the flavor of a cream cheese product with added strawberries. Alternatively, a strawberry flavor may be added to a plain cream cheese product producing a strawberry flavored cream cheese product.

EXAMPLE 1

An inventive cream cheese was prepared using the general method illustrated in FIG. 1 using the following recipe (based on 100 lbs cream cheese) and was compared with a conventional cream cheese control (i.e., homogenization pressure of about 2500 psi with a whey separation step):

| Ingredient | Control (lbs) | Inventive (lbs) |
|---|---|---|
| Milk | 97.6 | 16.2 |
| Cream | 62.8 | 62.0 |
| Liquid WPC | 0 | 20.7 |
| Dry WPC | 1.8 | 1.1 |
| Whey Powder | 1.2 | 0 |
| Salt | 0.7 | 0.7 |
| Carob Gum | 0.25 | 0.25 |
| Whey Removal | 103.3 | 0 |
| Cheese Yield | 61 | 100 |

Pasteurized milk and cream were obtained locally in a liquid form. Liquid and powdered whey protein concentrate (WPC) were used to standardize the whey protein: casein ratio and total protein content of the mix to the desired levels. The mix was blended using a high shear mixer (Breddo Liquefier) using the following parameters: 140° F. and 7500/750 psi (first and second stage) followed by pasteurization at 178° F. for 18 seconds. The pasteurized homogenate was cooled to 77° F. prior to culturing to a pH of 4.7. The resulting cream cheese (without any separation step) was heated to 180° F. After addition of salt and gum, the cream cheese was further heated to 195° F., held for 5 minutes, and then homogenized at 500 psi.

The control and inventive cream cheeses were compared with the following results:

| Criteria | Control | Inventive |
|---|---|---|
| Titratible acidity (%) | 0.77 | 0.53 |
| Sensory QDA sourness | Acid Bite Defect | No Acid Bite Defect |
| Total Protein (%) | 5.1 | 4.7 |
| Whey protein/casein | 30/70 | 75/25 |
| Whey Protein (%) | 1.5 | 3.5 |
| Casein (%) | 3.6 | 1.2 |
| Biological Value (BV) Index | 77 | 104 |
| Net Protein Utilization Index | 76 | 92 |
| Protein Efficiency Ratio | 2.9 | 3.6 |
| Medium Fat Particle Size (micron) | 1.04 | 0.41 |
| Amino Acids/100 g protein: | | |
| Cystine (g) | 0.3 | 2.4 |
| Leucine (g) | 10.4 | 11.1 |
| Isoleucine (g) | 5.7 | 6.8 |
| Threonine (g) | 4.6 | 8.0 |

This data clearly demonstrates the improved nutritional value of the inventive cream cheese as compared to conventional cream cheese.

EXAMPLE 2

An inventive sour cream was prepared using the general method illustrated in FIG. 2 using the following recipe (based on 100 lbs sour cream) and was compared with a conventional sour cream control:

| Ingredient | Control (lbs) | Inventive (lbs) |
|---|---|---|
| Condensed Whole Milk | 17.0 | 20.2 |
| Cream | 40.4 | 31.9 |
| Water | 41.1 | 46.4 |
| Starter | 1.5 | 1.5 |

Milk and cream were mixed in Breddo Liquefier, heated to 140° F., and then homogenized using a conventional (2500/750 psi) homogenizer for the control sample and a high-pressure (10,000/0 psi) homogenizer for the sample. The resulting homogenates were pasturized. After cooling to 72° F., starter culture was added and the mixture was allowed to ferment until the pH was lowered to 4.3.

The control and inventive sour cream were compared with the following results:

| | Control | Inventive |
|---|---|---|
| Total fat (%) | 18.2 | 15.2 |
| Total solids (%) | 25.3 | 22.8 |
| Protein (%) | 3.0 | 2.8 |
| Titratable acidity | 0.7 | 0.7 |
| pH | 4.3 | 4.3 |
| Process* | Septic | Aseptic |
| Homogenization Pressure (total/2nd stage; psi) | 2500/700 | 10,000/0 |
| Pasteurization conditions | 183° F./28 sec | 178° F./20 sec |
| Particle Size (microns) | 1 | 0.25 |
| Yield Stress (Haake; Pa) | 220 | 280 |

*For the septic process, pasteurization was conducted after homogenization; for the aseptic process, pasteurization was conducted before homogenization.

The inventive sour cream, although having reduced levels of fat, protein and total solids, was judged to be as firm and creamy as the control.

What is claimed is:

1. A method for manufacturing a dairy product having improved firmness, said method comprising:
   (1) mixing dairy ingredients comprising a dairy substrate, fat, and protein to generate a liquid dairy mix;
   (2) treating the liquid dairy mix to generate an emulsion having an average fat particle size of less than about 0.8 microns;
   (3) adding an acid-producing culture or an edible acid to the emulsion to reduce the pH to generate an acidified emulsion; and
   (4) heating the acidified emulsion to produce the dairy product;
   wherein the dairy product has a final average fat particle size of less than about 0.8 microns, and wherein the dairy product has improved firmness.

2. The method as defined in claim 1, wherein the dairy product is selected from the group consisting essentially of cream cheese, sour cream, and dairy products containing at least 4 percent fat.

3. The method as defined in claim 2, wherein the treatment of the liquid dairy mix to generate the emulsion is selected from the group consisting of high pressure homogenization, high shear mixing, ultrasound, and cavitation.

4. The method as defined in claim 3, wherein the liquid dairy mix is subjected to a heat treatment step prior to the treatment to generate the emulsion and wherein the heat treatment step is sufficient to essentially melt the fat in the liquid dairy mix.

5. The method as defined in claim 1, wherein the dairy product is cream cheese and wherein the method does not include a whey separation step.

6. The method as defined in claim 5, wherein the treatment of the liquid dairy mix to generate the emulsion is high pressure homogenization and wherein the high pressure homogenization is a single-stage homogenization at a pressure of greater than about 6000 psi.

7. The method as defined in claim 5, wherein the treatment of the liquid dairy mix to generate the emulsion is high pressure homogenization and wherein the high pressure homogenization is a two-stage homogenization at a pressure of greater than about 6000 psi in the first stage and at a pressure of less than about 1000 psi in the second stage.

8. The method as defined in claim 5, wherein the pH is reduced to about 4.5 to 5 in step (4).

9. The method as defined in claim 2, wherein the final average fat particle size of the dairy product is about 0.2 to about 0.6 microns.

10. The method as defined in claim 5, wherein the final average fat particle size of the dairy product is about 0.2 to about 0.6 microns.

11. A method for manufacturing a dairy product having improved firmness, said method comprising:
   (1) mixing dairy ingredients comprising a dairy substrate, fat, and protein to generate a liquid dairy mix containing about 4 to about 30 percent fat and about 2 to about 8 percent protein;
   (2) subjecting the liquid dairy mix to high pressure homogenization step at total pressure of at least about 6000 psi to generate a homogenate;
   (3) adding an acid-producing culture or an edible acid to the homogenate to reduce the pH to about 4.5 to about 5.0 to generate an acidified homogenate;
   (4) heating the acidified homogenate at about 180 to about 205° F. for about 2 to about 20 minutes to produce the dairy product;
   wherein the dairy product has an average fat particle size of about 0.1 to about 0.8 microns, and wherein the dairy product has improved creaminess, resistance to syneresis, and firmness.

12. The method as defined in claim 11, wherein the liquid dairy mix is subjected to a heat treatment step prior to the treatment to generate the emulsion and wherein the heat treatment step is sufficient to essentially melt the fat in the liquid dairy mix.

13. The method as defined in claim 11, wherein the acid-producing culture is used and the acid-producing culture is *Streptococcus lactis*.

14. A method as defined in claim 13, wherein the dairy product is a cream cheese.

15. The method as defined in claim 11, wherein the average fat particle size of the dairy product is about 0.2 to about 0.6 microns.

16. The method as defined in claim 12, wherein the average fat particle size of the dairy product is about 0.2 to about 0.6 microns.

17. The method as defined in claim 13, wherein the average fat particle size of the dairy product is about 0.2 to about 0.6 microns.

18. A method for producing a natural cream cheese having improved firmness and without the removal of whey, said method comprising the steps of:
   (1) providing a first liquid blend of dairy ingredients comprising about 20 to about 45 percent total solids, about 4 to about 30 percent fat, and about 2 to about 8 percent protein, wherein the whey protein to casein ratio is at least about 60:40;
   (2) heating the first liquid blend to a temperature and for a time sufficient to melt the fat in the liquid blend;
   (3) treating the heated first liquid blend to generate an emulsion having an average fat particle size of less than about 0.8 microns;
   (4) heating the emulsion to a temperature of about 162 to about 205° F. for about 15 seconds to about 5 minutes;
   (5) cooling the heated emulsion to about 32 to about 90° F.;
   (6) treating the cooled emulsion with an acidifying agent to provide a second liquid blend having a pH of about 4.5 to about 5;
   (7) heating the pH-adjusted second liquid blend to about 140 to about 175° F.;
   (8) adding salt and stabilizers to the heated pH-adjusted second liquid blend to provide a third liquid blend;
   (9) heating the third liquid blend to about 180 to about 205° F. for at least 5 minutes;
   (10) cooling the heated third liquid blend to about 155 to about 180° F.;
   (11) homogenizing the cooled third liquid blend at a pressure of about 500 to about 4000 psi to obtain the natural cream cheese; and
   (12) filling the natural cream cheese into appropriate containers,
   wherein the natural cream cheese has a final average fat particle size of less than about 0.8 microns, and wherein the natural cream cheese has improved firmness.

19. The method of claim 18, wherein the blend of dairy ingredients in step (1) comprises about 25 to about 45 percent total solids, about 10 to about 30 percent fat, and about 4 to about 8 percent protein.

20. The method of claim 18, wherein the natural cream cheese contains from about 50 to about 90 percent whey protein.

21. The method of claim 19, wherein the natural cream cheese contains from about 50 to about 90 percent whey protein.

22. The method of claim 18 further comprising the step of adding flavoring to the natural cream cheese.

23. The method of claim 18 further comprising the step of adding fruits, vegetables, or nuts to the natural cream cheese.

24. The method of claim 18, wherein the stabilizer is carob, xanthan, guar gum, and mixtures thereof.

25. The method of claim 18, wherein the dairy ingredients are milk, cream, and whey protein concentrate.

26. A method for producing a cream cheese without the removal of whey, said method comprising the steps of:
   (1) providing a blend of dairy ingredients comprising a dairy substrate, fat, and protein having a whey protein to casein ratio of at least about 60:40 to obtain a mixture;
   (2) homogenizing the mixture to obtain an emulsion having an average fat particle size of less than about 0.8 microns;
   (3) treating the emulsion with an acidifying agent to provide an acidified emulsion;
   (4) adding a stabilizer to the acidified emulsion to form a first mixture;
   (5) blending the first mixture to provide the cream cheese; and
   (6) filling the cream cheese into appropriate containers,
   wherein the cream cheese has a final average fat particle size of less than about 0.8 microns, and wherein the cream cheese has improved firmness.

27. The method of claim 26, wherein the cream cheese contains from about 50 to about 90 percent whey protein.

28. The method of claim 26 further comprising the step of adding flavoring to the cream cheese.

29. The method of claim 26 further comprising the step of adding fruits, vegetables, or nuts to the cream cheese.

30. The method of claim 26, wherein the stabilizer is carob, xanthan, guar gum, and mixtures thereof.

31. The method of claim 26, wherein the dairy ingredients are milk, cream, and whey protein concentrate.

32. A method for producing a sour cream having improved firmness, said method comprising the steps of:
   (1) providing a blend of dairy ingredients comprising a dairy substrate, fat, and protein;
   (2) pasteurizing the blend before or after step (3);
   (3) homogenizing the blend to obtain an emulsion having an average fat particle size of less than about 0.8 microns;
   (4) treating the pasteurized emulsion with an acidifying agent to provide the sour cream; and
   (6) filling the sour cream into appropriate containers,
   wherein the sour cream has a final average fat particle size of less than about 0.8 microns, and wherein the sour cream has improved firmness.

* * * * *